(No Model.)                      2 Sheets—Sheet 1.

L. H. KIMBALL.
SEEDING MACHINE.

No. 534,750.          Patented Feb. 26, 1895.

Witnesses

Inventor
Lewis H. Kimball
by his attorneys (No Model.) 2 Sheets—Sheet 2.

L. H. KIMBALL.
SEEDING MACHINE.

No. 534,750. Patented Feb. 26, 1895.

ON 5—5

ON 4—4

Witnesses,
Sidney P. Hollingsworth
C. M. Brooke.

Inventor,
Lewis H. Kimball
by his attorneys,
Baldwin Davidson & Wight

UNITED STATES PATENT OFFICE.

LEWIS H. KIMBALL, OF IOWA, JACKSON COUNTY, IOWA.

SEEDING-MACHINE.

SPECIFICATION forming part of Letters Patent No. 534,750, dated February 26, 1895.

Application filed November 2, 1894. Serial No. 527,762. (No model.)

*To all whom it may concern:*

Be it known that I, LEWIS H. KIMBALL, a citizen of the United States, residing in Iowa township, in the county of Jackson and State of Iowa, have invented certain new and useful Improvements in Seeding-Machines, of which the following is a specification.

My invention relates to seeding machines of the class in which the seed are fed through a continuous duct, by a feed screw or screws revolving therein.

The object of my invention is to secure a strong, simple, compact, durable and effective seeding machine, capable of delivering the seed over an extended area.

My improvements also contemplate having the seed-delivery devices readily adjustable, and the seed-conveyers removable, so that they may be more compactly arranged on the carriage when the machine is under shelter, or being transported from place to place. These ends I attain by certain novel combinations and organizations of instrumentalities hereinafter described and claimed.

In order to carry out my invention in the best way now known to me, I mount a hopper on the axle of a sulky, so that it shall be above and between the wheels. Two screw-conveyers work in ducts connected with the hopper, interposed between it and the wheels over which they project laterally, parallel or substantially so with the axle, and carry the seed to feeding or dropping devices underneath the ducts, which discharge the seed both between and on each side of the wheels. This organization enables me to distribute seed over an area more than twice as great as the distance between the carrying wheels, without undue weight or strain on the mechanism. Each conveyer consists of a duct, trough, or tube containing a screw rotated by gearing connected with the axle of the sulky. A series of seed-dropping devices in the outlets of the conveyers are actuated from the screw-shafts through proper gearing. The hopper is divided into compartments, so that different kinds of seed simultaneously may be discharged therefrom, the seed from the compartments being thoroughly mingled in the feed-ducts before delivery therefrom.

Figure 1:
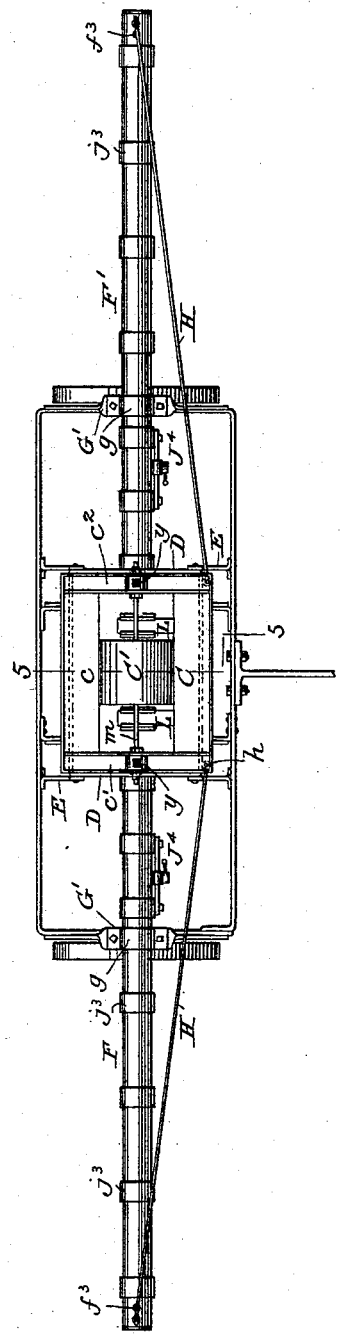
Figure 2:
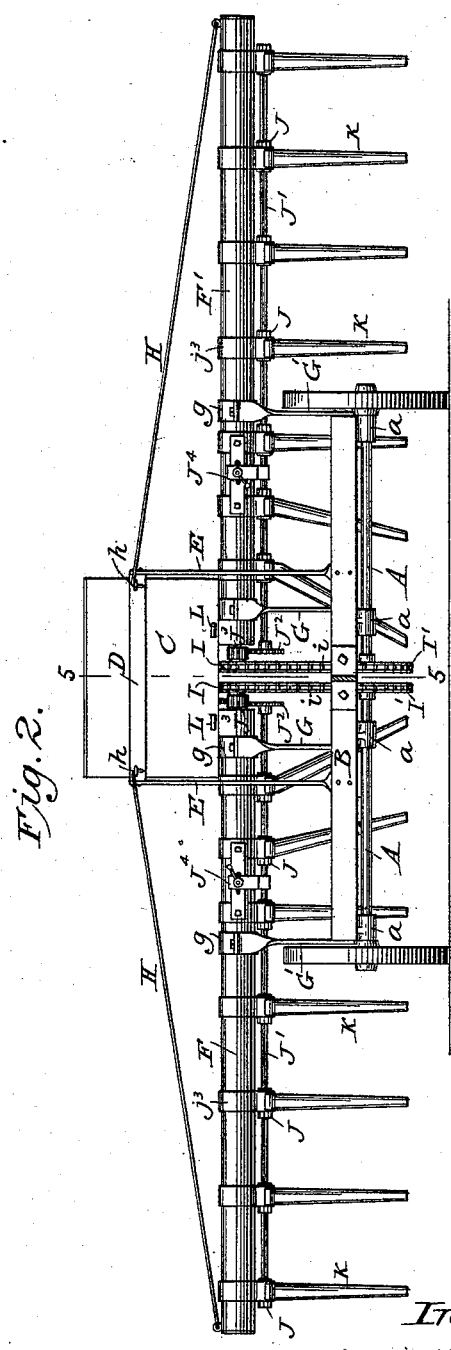
Figure 3:
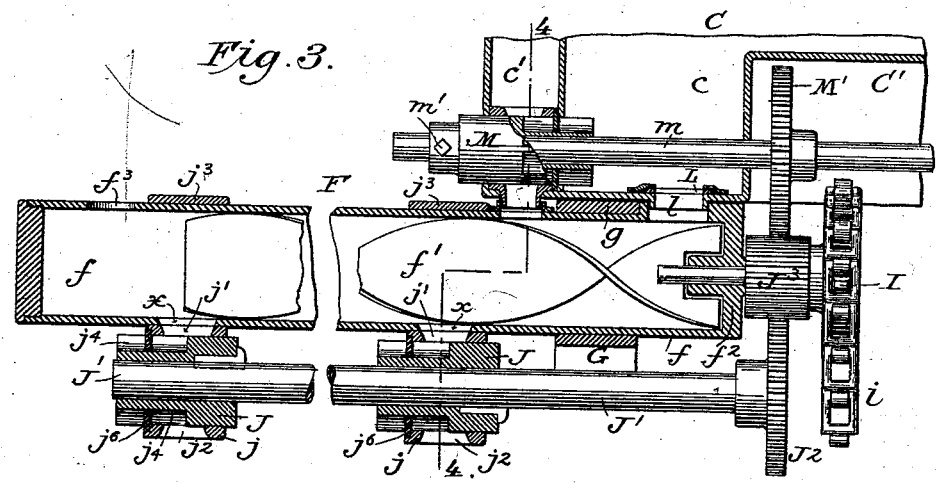
Figure 5:
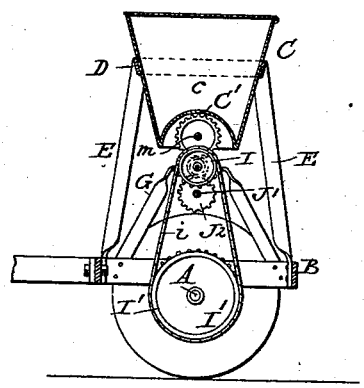
Figure 4:
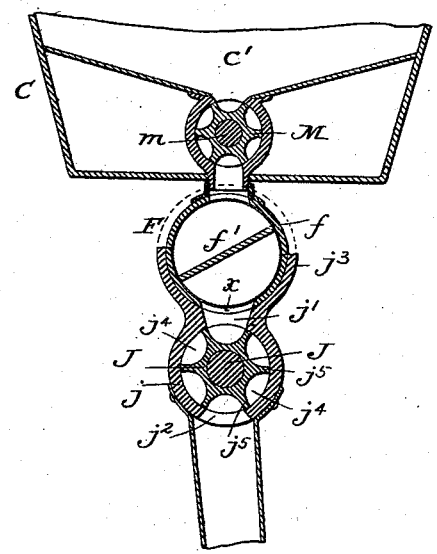
Figure 6:
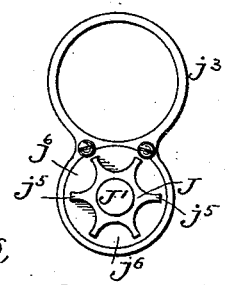

In the accompanying drawings, which show all my improvements as embodied in a single seeding-machine,—Figure 1 is a plan, and Fig. 2, a front elevation of the entire machine. Fig. 3 represents, on an enlarged scale, a view partly in elevation and partly in vertical, longitudinal section of one section of the seed-delivery mechanism; Fig. 4, a vertical, transverse section on the line 4—4 of Fig. 3; Fig. 5, a vertical, transverse section on the line 5—5 of Figs. 1 and 2, and Fig. 6 is a detail view of one of the seed dropping devices.

The drawings show two carrying or driving wheels, fixed on an axle A, turning in bearings $a$, in a main frame B. This axle preferably is divided centrally and transversely, so that each wheel turns with its own section of the axle, independently of the other.

Standards E, rising from the main frame B, support a frame D, carrying a hopper C, shown as consisting of a large central compartment $c$, and two smaller end compartments $c'$, $c^2$. The central compartment has an elevated central bottom portion, forming a housing for a part of the gearing hereinafter described. An opening in the central compartment each side of this housing leads to the duct or conveyer F, F'. Each end compartment $c'$, $c^2$, in like manner opens into its corresponding duct. These ducts or conveyers are shown as consisting essentially of a tube or trough $f$, with a screw $f'$, rotating therein. Each section of this tube or trough extends laterally beyond its supporting wheel in substantially the same vertical plane as, and parallel with the axle. Each section of the duct is supported by standards G, G', rising from the main frame B, and provided with detachable connections or yokes $g$.

Braces H, flexibly connected with the outer ends of the ducts, extend inwardly upward and forward, and are secured to the upper front corners of the hopper-frame D, by detachable fastenings $h$, thus relieving the ducts and standards somewhat from undue strains, and insuring the correct alignment of the ducts.

Each screw shaft $f'$, has its bearings at the inner end $f^2$, of the duct, which is there closed. The projecting end of each screw-shaft carries a sprocket-pulley I, driven by a chain $i$, from a corresponding sprocket-wheel I', on the approximate inner end of the sectional axle A. This arrangement enables me to actuate the screw-conveyers directly from the axle in an efficient and simple way.

The conveyers drop the seed through discharge-ports $x$, upon longitudinally recessed or toothed rollers J, on shafts J', each carrying on its central or inner end a cog $J^2$, gearing with a pinion $J^3$, on the screw-conveyer shaft. These rollers J are each mounted in a casing $j$, having an opening registering with the corresponding port $x$, in the duct, and also with a discharge-opening $j^2$, through which seed is delivered directly upon the ground, or through a tube K, which may have a scatterer $k$, at its lower end. Each casing $j$, is provided with an annular extension $j^3$, in which the duct or conveyer-tube rests.

Each roller J is provided with cups or compartments $j^4$, into which the seed fall through the openings $j'$, and by the rotation of which it is discharged in proper quantities through the opening $j^2$, into the discharge-spout K. These cups, as shown in Fig. 3, are closed at one end, but open at the other. The webs $j^5$ or walls separating the cups, pass through slots in washers $j^6$, secured to the casing $j$. The seed dropping devices are similarly arranged on each side of the machine. Each section of the shaft J', may be separately adjusted by suitable well-known devices $J^4$, to regulate the feed by varying the size of these cups.

The amount of grain fed to the conveyers from the main compartment $c$, of the hopper, may be regulated by hand-operated slides L, at each opening $l$, on opposite sides of the central line of draft.

Seed are fed from the smaller compartments $c'$ $c^2$, through cupped or recessed rollers M, similar in construction and operation to the roller J above described. The rollers M are mounted on a shaft $m$, extending through the lower portion of the hopper, and driven by means of the pinion $J^3$, gearing with a spur-wheel M', on the shaft $m$. This shaft preferably revolves in a fixed position in its bearings, and projects beyond the hopper at each end, and the rollers M slide endwise thereon to adjust the feed, and are fastened in any desired position by set-screws $m'$, the rollers being mounted on the projecting ends of the shaft. The seed from each end hopper are thus fed into the conveyer, and there mingled with seed from the central hopper before being discharged.

In case the conveyers feed the seed too fast for the discharge cups to carry it off, the surplus may escape through an opening $f^3$, (Fig. 3) in the outer end of the conveyer, and thus attract the operator's attention to notify him that regulation of the feed is necessary.

My actuating-gearing being centrally located, it becomes desirable to arrange the delivery-tubes when used, so that their discharge ends may be uniform. This end I attain as shown in Fig. 2, by arranging the feed-rollers and corresponding discharge-spouts closer together between than beyond or outside of the wheels, and correspondingly deflecting or inclining the spouts so as to make the distance between their discharge ends correspond with the outside ones.

The hopper C may be readily lifted or removed from its supporting-frame D, in which case the yokes $g$, can easily be removed, and the ducts and connected parts separated from their supports. The ducts, &c., may then be attached centrally to the frame of the sulky to permit the machine conveniently to be stored or transported; it being only necessary to lift the hopper, uncouple the yokes, and detach the sprocket-chains on each side. These parts can again quickly be assembled or replaced when desired.

The operation of my improved seeder will readily be understood from the foregoing description.

Having thus fully described the construction, organization, and operation of my improved seeding-machine, what I claim therein as new and of my own invention is—

1. The combination, substantially as hereinbefore set forth, of a sulky, a hopper carried thereby, a seed tube, trough or duct connected with the hopper and arranged above the plane of the carrying wheels, a feed screw revolving in the duct, and a direct driving connection approximately in the central line of draft between the screw shaft and the axle.

2. The combination, substantially as hereinbefore set forth, of a main frame, a driving axle, supporting wheels thereon, a hopper above the wheels, a conveyer duct extending over and beyond the plane of the wheels, and a feed screw revolving in the duct and geared to the axle, in approximately the central line of draft for the purpose specified.

3. The combination, substantially as hereinbefore set forth, of a main frame, a driving axle, supporting wheels thereon, a hopper carried by the main frame, conveyer tubes or ducts connected with the hopper and extending in opposite directions therefrom over and beyond the wheels, and feed screws in the ducts geared to the axle in approximately the central line of draft.

4. The combination, substantially as hereinbefore set forth, of a main frame, the sectional or divided driving axle, a supporting and driving wheel secured to and turning with each section of the axle, a hopper mounted on the main frame, a centrally divided conveyer duct connected with the hopper and extending beyond the wheels, feed screws in the duct, and gearing driving each section of the screw from its corresponding section of the axle.

5. The combination, substantially as hereinbefore set forth, of a main frame, the driving axle, supporting wheels thereon, a hopper above the wheels, a conveyer duct extending over and beyond the wheels, a feed screw in the duct, and seed dropping devices below the duct, the duct, screws and dropping devices all being interposed between the hopper and the driving wheels and above the latter, for the purpose described.

6. The combination, substantially as hereinbefore set forth, of the hopper, a conveyer trough or tube opening into the hopper, a series of adjustable seed dropping devices arranged at the delivery ports in the conveyer tube, and a screw conveyer operated simultaneously with the seed dropping devices.

7. The combination, substantially as hereinbefore set forth, of the main frame, the wheels and axle, the hopper, a seed duct extending from the hopper beyond the wheels, a feed screw revolving in the duct, a series of recessed rollers at the delivery openings in the duct, a shaft on which they are mounted, a cog on said shaft gearing with a pinion on the shaft of the feed screw, and sprocket gearing connecting the shaft of the feed screw with the axle of the sulky.

8. The combination, substantially as hereinbefore set forth, with a hopper divided into compartments, of a tube or trough connected with said compartments, and receiving seed from them and a seed feeding screw arranged within the conveyer tube or trough to mix or intermingle different kinds of seed from the several compartments before their delivery through the discharge ports of the tube.

9. The combination, substantially as hereinbefore set forth, of a hopper divided into a series of compartments, conveyer tubes or ducts on opposite sides of the hopper and connected with the compartments thereof, screw conveyers within the tubes, gearing connecting them with the axle of the carrying wheels, and devices for regulating the amount of seed fed from the compartments to the tubes.

10. The combination, substantially as hereinbefore set forth, of a hopper divided into a series of compartments, conveyers connected with the hopper, gates or slides for regulating the opening between the larger compartment of the hopper and the conveyer, and an adjustable roller between each smaller compartment of the hopper and the conveyer.

11. The combination, substantially as hereinbefore set forth, of a hopper divided into a series of compartments, a conveyer trough or tube connected with said compartments, means for regulating the amount of seed fed from the compartments to the trough or tube, adjustable seed dropping devices arranged at the delivery ports of the conveyer tube, and devices for feeding the seed from the hopper through the tube and mixing or intermingling different kinds of seed from the several compartments.

12. The combination, substantially as hereinbefore set forth, of a hopper divided into a central and end compartments, seed conveyers connected therewith, feed slides regulating the feed from the central compartment to the conveyer, a roller feed regulating the discharge from one of the smaller compartments to the same conveyer, a roller feed connecting shaft passing through the lower portion of the hopper, and driving gearing below the central portion of the hopper and connected with the axle of the sulky.

13. The combination, substantially as hereinbefore set forth, with the conveyer tubes, of a series of spouts or delivery tubes between the wheels of the carriage and outside of them, the tubes or spouts being at their upper ends arranged closer together than the tubes outside the wheels, and some of them being bent or inclined as described, for the purpose specified.

In testimony whereof I have hereunto subscribed my name.

LEWIS H. KIMBALL.

Witnesses:
LLOYD B. WIGHT,
C. M. BROOKE.